United States Patent
Kondapi et al.

(10) Patent No.: US 10,802,818 B2
(45) Date of Patent: Oct. 13, 2020

(54) AUTOMATIC FIRMWARE UPDATES

(71) Applicant: Dell Products L.P., Round Rock, TX (US)

(72) Inventors: Srikanth Kondapi, Austin, TX (US); Nathan F. Martell, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 658 days.

(21) Appl. No.: 15/584,568

(22) Filed: May 2, 2017

(65) Prior Publication Data

US 2018/0321933 A1 Nov. 8, 2018

(51) Int. Cl.
| | |
|---|---|
| *G06F 9/44* | (2018.01) |
| *G06F 8/656* | (2018.01) |
| *G06F 15/177* | (2006.01) |
| *G06F 16/23* | (2019.01) |
| *G06F 8/654* | (2018.01) |
| *G06F 9/30* | (2018.01) |

(52) U.S. Cl.
CPC .............. *G06F 8/656* (2018.02); *G06F 8/654* (2018.02); *G06F 15/177* (2013.01); *G06F 16/23* (2019.01); *G06F 9/30141* (2013.01)

(58) Field of Classification Search
CPC .......... G06F 8/654; G06F 8/656; G06F 16/23; G06F 15/177
See application file for complete search history.

(56) References Cited

U.S. PATENT DOCUMENTS

| | | | |
|---|---|---|---|
| 2001/0020268 A1* | 9/2001 | Kawano | G06F 1/1632 713/2 |
| 2008/0028385 A1* | 1/2008 | Brown | G06F 8/65 717/170 |

(Continued)

OTHER PUBLICATIONS

George Kornaros and Svoronos Leivadaros, Securing Dynamic Firmware Update of Mixed-Critical Applications, IEEE, 2017, retrieved online on Jul. 7, 2020, pp. 1-7. Retrieved from the Internet: <URL: https://ieeexplore.ieee.org/stamp/stamp.jsp?>. (Year: 2017).*

(Continued)

*Primary Examiner* — Hanh Thi-Minh Bui
(74) *Attorney, Agent, or Firm* — Baker Botts L.L.P.

(57) ABSTRACT

In one or more embodiments, one or more systems, methods, and/or processes may determine that an external device is coupled to an input/output (I/O) port of an information handling system and may provide a first message to an information handling system firmware (IHSFW) that indicates information associated with the external device. The IHSFW may provide a second message to a management information exchange, and the management information exchange may start an application in response to the second message. The application may determine firmware of the external device can be updated, may receive user input that indicates updating the firmware of the external device, may retrieve new firmware associated with the external device, and may provide the new firmware to the external device. In one or more embodiments, the new firmware associated with the external device may be retrieved before the external device is coupled to the information handling system.

16 Claims, 4 Drawing Sheets

(56) References Cited

U.S. PATENT DOCUMENTS

| | | | | |
|---|---|---|---|---|
| 2009/0278679 A1* | 11/2009 | Dailey | ................... | G06F 9/542 |
| | | | | 340/500 |
| 2014/0007073 A1* | 1/2014 | Cavalaris | ................. | G06F 8/63 |
| | | | | 717/172 |
| 2014/0317611 A1* | 10/2014 | Wojcik | ...................... | G06F 8/71 |
| | | | | 717/168 |
| 2016/0378511 A1* | 12/2016 | Jung | .................... | G06F 21/572 |
| | | | | 713/2 |
| 2017/0123456 A1* | 5/2017 | Chung | ................. | G06F 1/1632 |
| 2017/0242686 A1* | 8/2017 | Vidyadhara | ............. | G06F 8/656 |
| 2018/0152341 A1* | 5/2018 | Maeda | ................... | G06F 11/00 |

OTHER PUBLICATIONS

Dell Command/Update, Version 2.3 User's Guide, 2009, 34 pages, 2009.

"Common Information Model (CIM) Infrastructure" by DMTF Document No. DSP0004, Date: Apr. 22, 2012, Version 2.7.0, 186 pages, Apr. 22, 2012.

* cited by examiner

AUTOMATIC FIRMWARE UPDATES

BACKGROUND

Field of the Disclosure

This disclosure relates generally to information handling systems and more particularly to updating firmware of an external device coupled to an information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, when a device was coupled to an information handling system, an application would continually execute via the information handling system would determine what type of device was coupled to the information handling system and determine if there was a firmware update for the device. If there was a firmware update for the device, the application would download, or acquire the firmware via other means (e.g., thumbdrive, floppy disk, CD-ROM, etc.), and install the firmware update on the device. Sometimes a user of the information handling system would need to start and/or initialize the application to search for updates to different devices coupled to the information handling system.

SUMMARY

In one or more embodiments, one or more systems, methods, and/or processes may determine that an external device is coupled to an input/output (I/O) port (e.g., a Type-C port, a USB-C port, etc.) of the information handling system and may provide a first message to an information handling system firmware (IHSFW) that indicates information associated with the external device. For example, an embedded controller of the information handling system may determine that the external device is coupled to the I/O port and may provide the first message to the IHSFW that indicates the information associated with the external device. The IHSFW may provide a second message to a management information exchange, and the management information exchange may start an application in response to the second message. For example, the application may be registered with the management information exchange. The application may determine that firmware of the external device can be updated, may receive user input that indicates updating the firmware of the external device, may retrieve new firmware associated with the external device, and may provide the new firmware to the external device. In one or more embodiments, the new firmware associated with the external device may be retrieved before the external device is coupled to the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
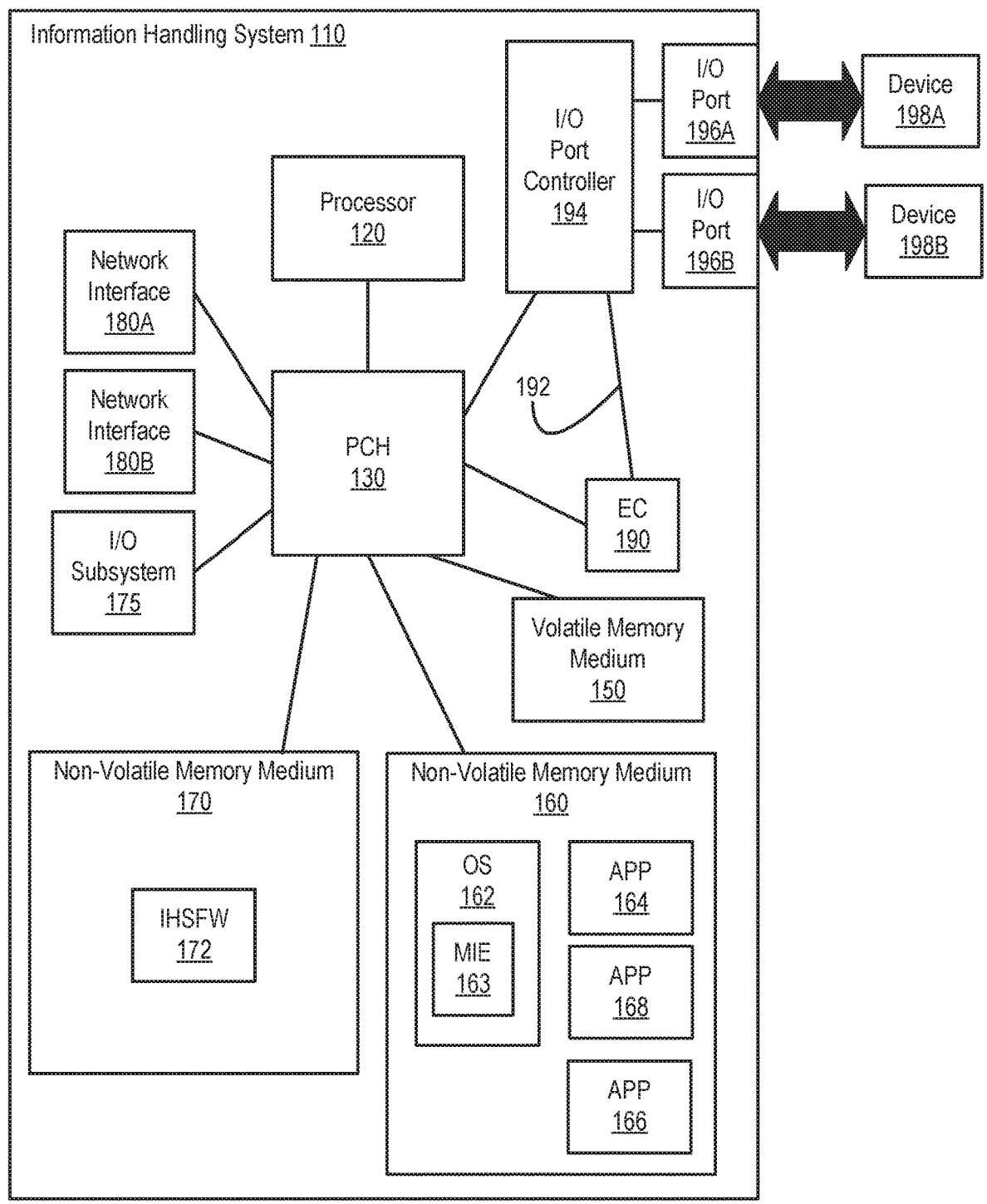
FIGS. 1A and 1B illustrate an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, an external device may be coupled to an information handling system (IHS), and an embedded controller (EC) of the IHS may detect that external device is coupled to the IHS and may receive information associated with the external device. For example, the EC may determine one or more attributes of the external device via the information associated with the external device. For instance, the one or more attributes may include one or more of a type of external device, a firmware version of the external device, a protocol utilized by the external device, an energy consumption of the external device, an energy supply of the external device, and a communication speed of the external device (e.g., a data rate of the external device), among others.

In one or more embodiments, the EC may provide information, based on the one or more attributes of the external device, to an information handling system firmware (IHSFW) of the IHS, and the IHSFW may provide a message to an operating system (OS) executing via a processor of the IHS. For example, the OS may include a management information exchange, and the IHSFW may provide the message to one or more of the OS and an application (APP), among others. For instance, the APP may be registered with the OS, and the APP may be executed in response to the OS receiving the message. In one or more embodiments, the APP may not be executed until the OS starts and/or launches the APP. For example, the OS may start and/or launch the APP in response to receiving the message. For instance, waiting to start and/or launch the APP until the OS receives the message may conserve or assist in conserving one or more resource of the IHS (e.g., processor resources, memory resources, energy resources, etc.).

In one or more embodiments, the message may include information based on the one or more attributes of the external device, and the APP may determine one or more actions based on the information based on the one or more attributes of the external device. For example, the APP may compare the firmware version of the external device with an available firmware version. For instance, the available firmware version may be more recent than the firmware version of the external device. In one or more embodiments, the APP may maintain a list and/or a database that includes versions of updates available. In one example, the updates available may be available via a network. For instance, the APP may include a System Center Configuration Manager (available from Microsoft Corporation), a Dell Command|Update (available from Dell, Inc.), or a KACE (available from Quest Software, Inc.), among others. In another example, the updates available may be available via a memory medium of the IHS. For instance, the APP may obtain one or more updates before the external device is coupled to the IHS.

In one or more embodiments, the APP may provide a user interface (e.g., a graphical user interface) to a user with information associated with the one or more actions. For example, the user interface may include information indicating at least one action, of the one or more actions, that may be performed. For instance, the APP may receive input indicating that the at least one action is to be performed.

In one or more embodiments, the APP may receive the available firmware version. In one example, the APP may receive the available firmware version in response to the input indicating that the at least one action is to be performed. For instance, the at least one action to be performed may include retrieving the available firmware version. In another example, the APP may retrieve the available firmware version via at least one of a network (e.g., from another IHS) and a memory medium, among others. In one or more embodiments, the APP may install the available firmware version on the external device. For example, the APP may install the available firmware version on the external device in response to the input indicating that the at least one action is to be performed. For instance, the at least one action is to be performed may include installing the available firmware version on the external device.

Turning now to FIG. 1A, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a platform controller hub (PCH) 130, a volatile memory medium 150, non-volatile memory media 160 and 170, an I/O subsystem 175, network interfaces 180A and 180B, an EC 190, an I/O port controller 194, and an I/O ports 196A and 196B. As illustrated, processor 120, volatile memory medium 150, non-volatile memory media 160 and 170, I/O subsystem 175, network interfaces 180A and 180B, EC 190, and I/O port controller 194 may be communicatively coupled to PCH 130, and I/O ports 196A and 196B may be coupled to I/O port controller 194. In one or more embodiments, PCH 130 may transfer information between or among two or more of processor 120, volatile memory medium 150, non-volatile memory media 160 and 170, network interfaces 180A and 180B, EC 190, and IO port controller 194, among others not specifically illustrated.

In one or more embodiments, one or more of volatile memory medium 150, non-volatile memory media 160 and 170, I/O subsystem 175, network interface 180, EC 190, and I/O port controller 194 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, EC 190, and I/O port controller 194, among others, may be communicatively coupled to processor 120 via one or more PCI-Express (PCIe) root complexes. In another example, one or more of I/O subsystem 175, network interface 180, EC 190, and I/O port controller 194, among others, may be communicatively coupled to processor 120 via one or more PCIe switches.

In one or more embodiments, port 196 may be or include a type-C port. In one example, the type-C port may be or include a USB-C connector. For instance, the USB-C connector may be or include a female USB-C connector. In a second example, the type-C port may receive energy from an energy source (e.g., a battery, an energy supply, etc.). In another example, the type-C port may provide energy to a device (e.g., a device 198). As illustrated, devices (e.g., type-C devices, devices with type-C connectors, etc.) 198A and 198B may be coupled to and uncoupled from respective I/O ports 196A and 196B. In one or more embodiments, device 198 may be communicatively coupled and/or mechanically coupled to port 196. In one example, contacts of device 198 may be coupled to contacts of port 196. In another example, device 198 may be physically coupled to port 196. In one or more embodiments, device 198 may be or include a dock device. For example, the dock device may include one or more of a display output, one or more USB ports, one or more network interfaces, an audio input, and an audio output, among others. For instance, the dock may be or include a Thunderbolt dock.

In one or more embodiments, EC 190 may be communicatively coupled to I/O port controller 194 via a bus 192. In one example, bus 192 may include one or more of a LPC bus, an eSPI bus, a SPI bus, and an I²C bus, among others. For example, EC 190 may receive information associated with device 198 via bus 192. In one or more embodiments, the information associated with device 198 may include one or more of error information and one or more attributes, among others. For example, the one or more attributes may include one or more of a type of device 198, a firmware version of device 198, a protocol utilized by device 198, an energy consumption of device 198, an energy supply of device 198, and a communication speed of device 198 (e.g., a data rate of device 198), among others. For instance, the protocol utilized by device 198 may include a USB protocol, a Thunderbolt protocol, a PCIe protocol, a Base-T protocol, a display port protocol, or a high-definition multimedia interface (HDMI) protocol, among others.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example network interface 180 may enable IHS 110 to communicate over a network utilizing a suitable transmission protocol and/or standard. In a second example, network interface 180A may be coupled to a wired network. In a third example, network interface 180A may be coupled to an optical network. In another example, network interface 180B may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof, among others. In one or more embodiments, a network and its various components may be implemented using hardware, software, or any combination thereof.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include an IHSFW 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

As shown, OS 162 may include a management information exchange (MIE) 163. In one example, MIE 163 may permit multiple components to exchange management information associated with managed elements (e.g., elements of IHS 110) and/or may permit control and/or management of the managed elements. In another example, MIE 163 may include a driver and/or a driver model that may provide an OS interface through which managed elements may provide information and/or notifications, among others. In one instance, MIE 163 may be or include a Windows Management Interface (WMI) for ACPI (available from Microsoft Corporation). In another instance, MIE 163 may be or include a Common Information Model (CIM) (available via the Distributed Management Task Force). In one or more embodiments, EC 190 may utilize MIE 163 in providing information to OS 162. For example, EC 190 may utilize at least one of WMI and CIM, among others, in providing the information to OS 162. For instance, the information provided to OS 162 may include error information and/or event information, among others.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

Figure 1B:
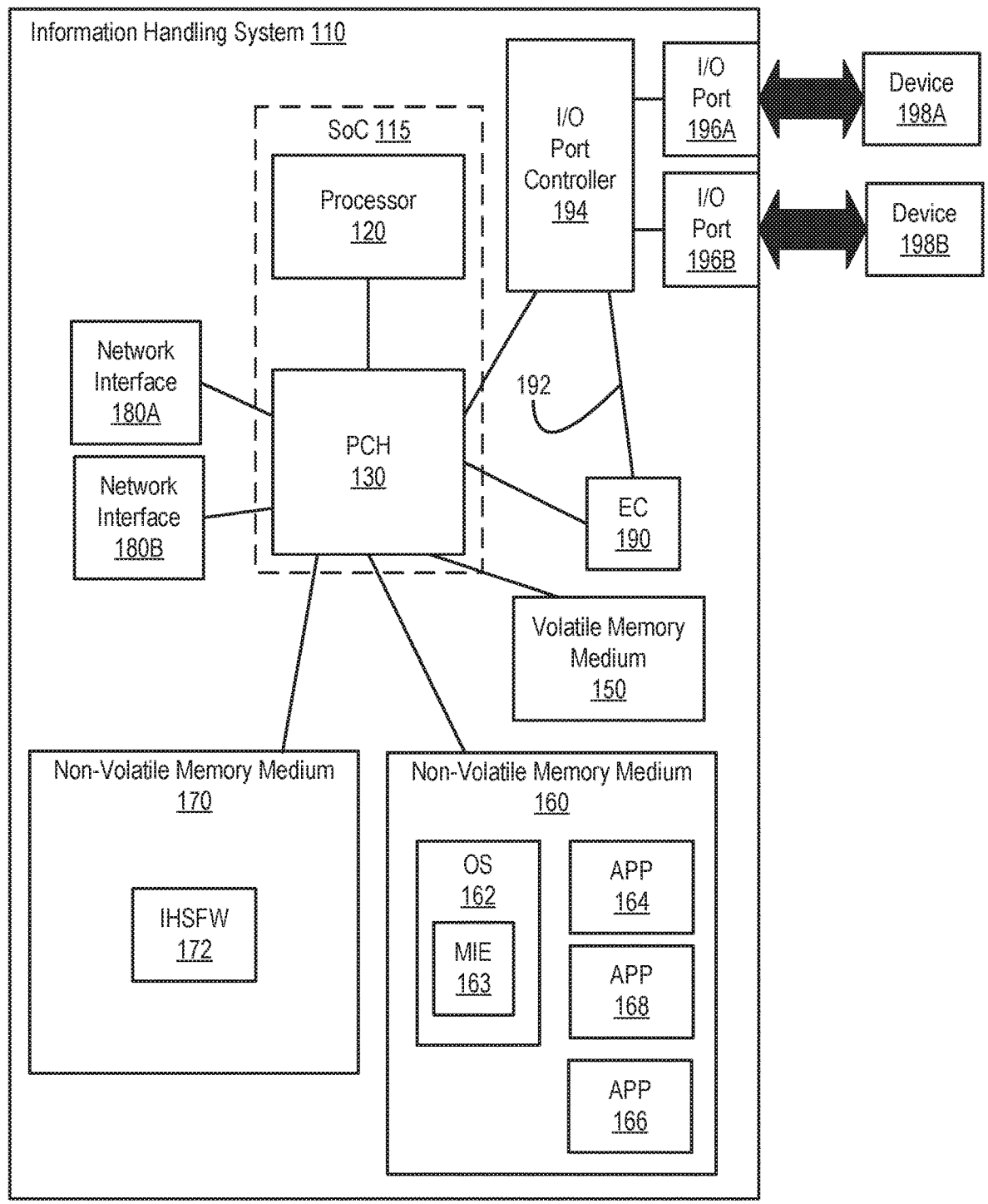

In one or more embodiments, processor 120 and PCH 130, among others, may be included in a system-on-chip (SoC). For example, as illustrated in FIG. 1B, a SoC 115 may include processor 120 and PCH 130, among others.

Figure 2:
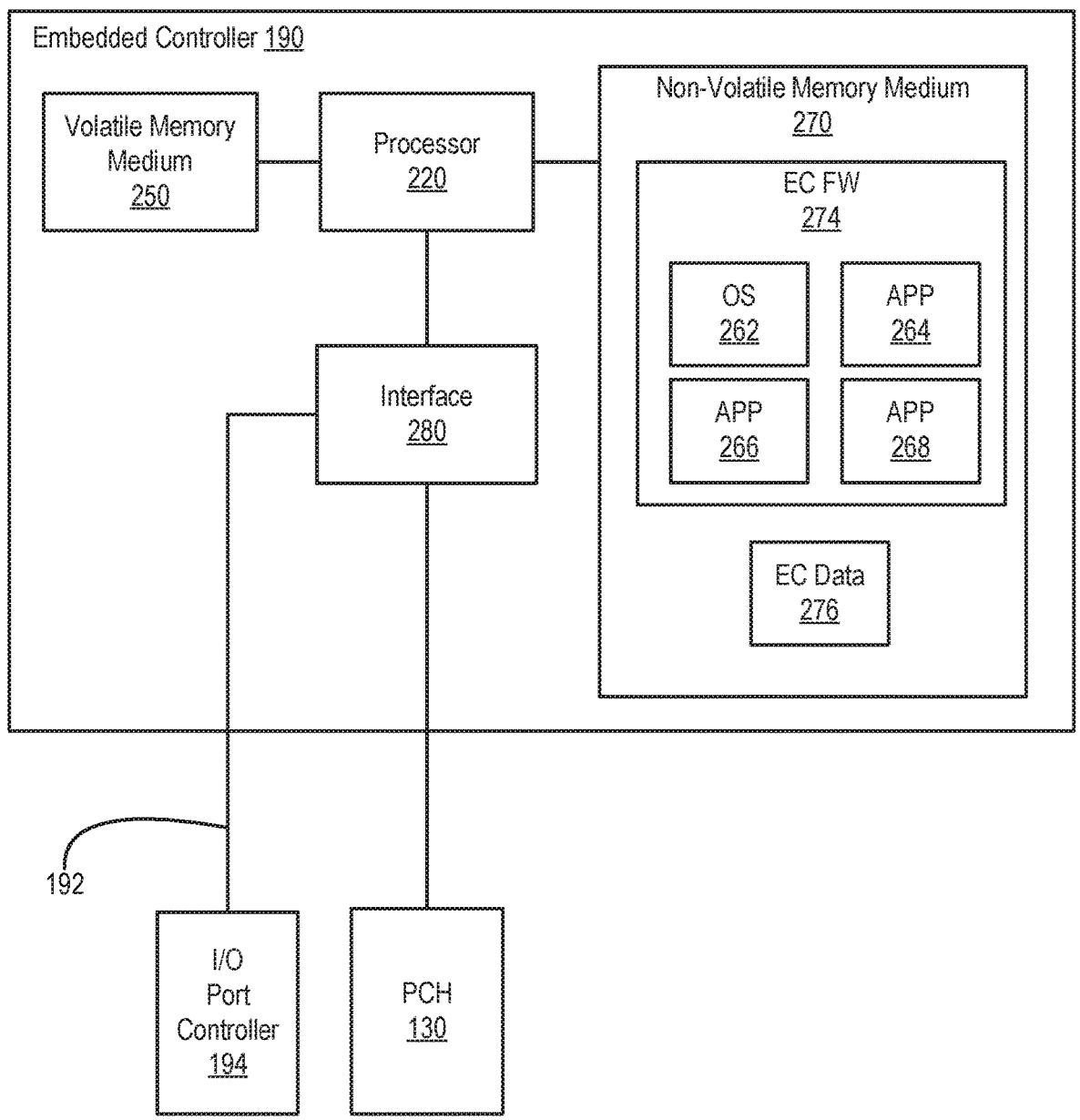
FIG. 2 illustrates an exemplary embedded controller, according to one or more embodiments.

Turning now to FIG. 2, an exemplary embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 276. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In another example, I interface 280 may include circuitry that enables one or more interrupt signals to be received. For instance, interface 280 may include general purpose input/output (GPIO) circuitry, and the GPIO circuitry may enable one or more interrupt signals to be received via at least one interrupt line.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

In one or more embodiments, processor 220 may utilize EC data 276. In one example, processor 220 may utilize EC data 276 via non-volatile memory medium 270. In another example, one or more portions of EC data 276 may be transferred to volatile memory medium 250, and processor 220 may utilize EC data 276 via volatile memory medium 250.

Figure 3:
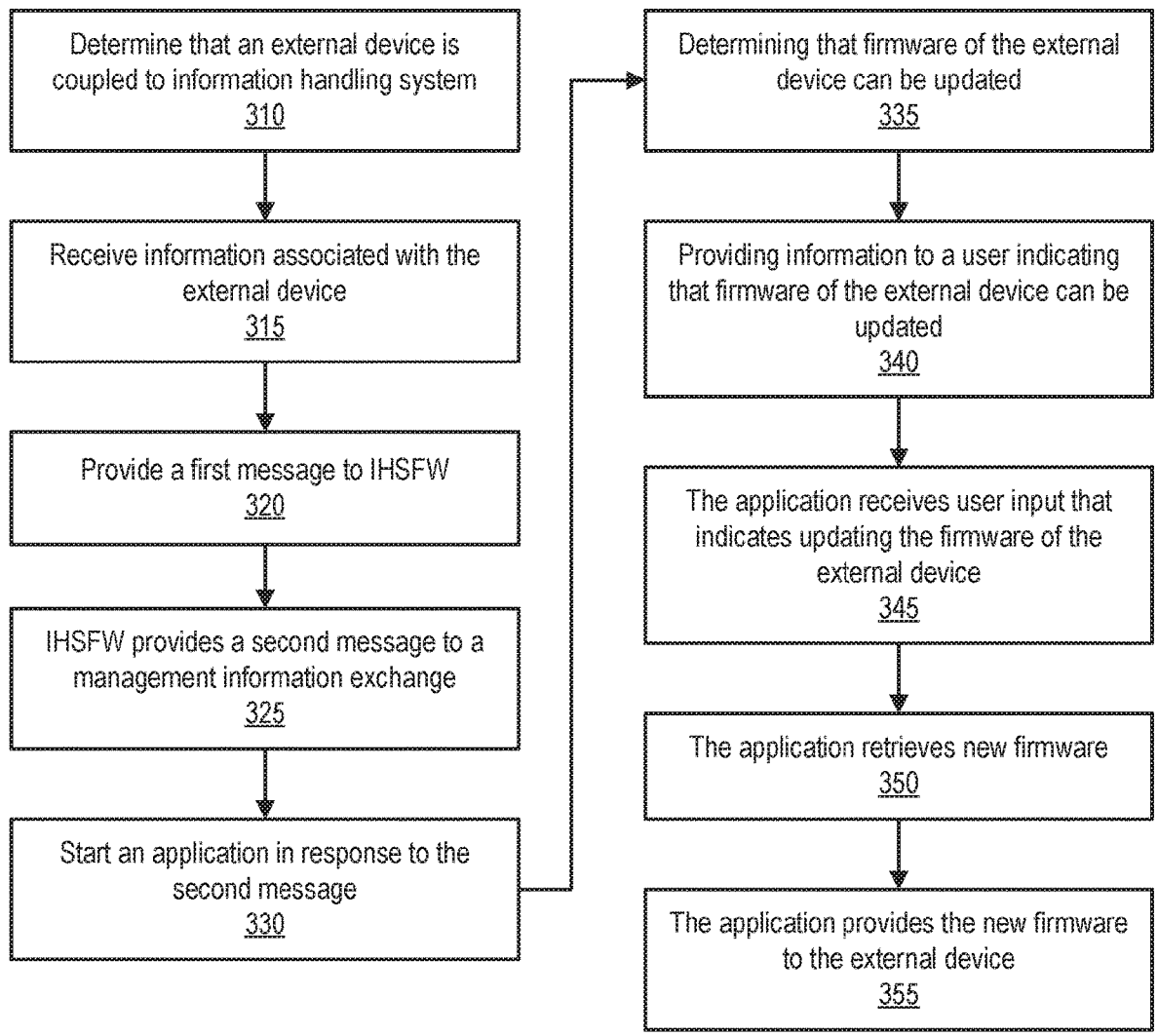
FIG. 3 illustrates a method of operating an information handling system, according to one or more embodiments.

Turning now to FIG. 3, a method of operating an information handling system is illustrated, according to one or more embodiments. At 310, it may be determined that an external device is coupled to an information handling system. For example, EC 190 may determine that device 198 is coupled to IHS 110. In one or more embodiments, determining that device 198 is coupled to IHS 110 may include detecting an insertion of device 198 into a port of IHS 110. For example, I/O port controller 194 may detect the insertion of device 198 into I/O port 196 or may detect a communications cable, associated with device 198, into I/O port 196. For instance, EC 190 may receive information, from I/O port controller 194, that indicates the insertion of device 198 into I/O port 196 or the insertion of the communications cable, associated with device 198 (e.g., the communications cable coupled to device 198), into I/O port 196. In one or more embodiments, EC 190 determining that device 198 is coupled to IHS 110 may include receiving an interrupt. For example, EC 190 may receive an interrupt from I/O port controller 194. For instance, EC 190 may be a bus master of bus 192, may receive an interrupt from I/O port controller 194, and may query I/O port controller 194 and receive information from I/O port controller 194 that indicates the insertion of device 198 into I/O port 196.

At 315, information associated with the external device may be received. For example, EC 190 may receive information associated with device 198. For instance, EC 190 may receive or determine one or more attributes, from the information associated with device 198. In one or more embodiments, the one or more one or more attributes may include one or more of a type of device 198, a firmware version of device 198, a protocol utilized by device 198, an energy consumption of device 198, an energy supply of device 198, and a communication speed of device 198 (e.g., a data rate of device 198), among others.

At 320, a first message may be provided to an IHSFW of the information handling system. In one or more embodiments, EC 190 may provide the first message to IHSFW 172. For example, the message may include one or more attributes associated with device 198. For instance, the one or more attributes of device 198 may include one or more of a type of device 198, a firmware version of the external device, a communication protocol utilized by device 198, an energy consumption of device 198, an energy supply of device 198, and a communication speed of device 198 (e.g., a data rate of device 198), among others.

At 325, the IHSFW may provide a second message to a management information exchange. For example, IHSFW 172 may provide the second message to MIE 163. For instance, IHSFW 172 may provide the second message to OS 162 via MIE 163. In one or more embodiments, the second message may include one or more of the one or more attributes of the first message.

At 330, an application may be started in response to the second message. In one or more embodiments, the application may be registered with the management information exchange. For example, MIE 163 may start and/or launch the application (e.g., an APP of APPs 164-166) registered with MIE 163. In one or more embodiments, MIE 163 may start and/or launch the application based on one or more of the one or more attributes that the second message includes.

At 335, it may be determined that firmware of the external device may be updated. For example, the application may determine that firmware of device 198 may be updated. For instance, the application may determine that new firmware for device 198 is available and/or may be provided to device 198. In one or more embodiments, determining that firmware of the external device may be updated may include determining a version of firmware of the external device and comparing the version of firmware of the external device with a version of an available firmware for the external device. For example, the version of the available firmware for the external device may indicate that the available firmware for the external device may be or include a new firmware for the external device. For instance, the new firmware for the external device may include an updated firmware for the external device.

At 340, information indicating that firmware of the external device can be updated may be provided to a user. For example, the application may provide, to the user, the information indicating that firmware of the external device can be updated. At 345, user input that indicates updating the firmware of the external device may be received. For example, the application may receive the user input that indicates updating the firmware of the external device. For instance, the user input may indicate that the application may be permitted to install an update to device 198.

At 350, new firmware for the external device for the external device may be retrieved. For example, the application may retrieve the new firmware for device 198. In one or more embodiments, retrieving the new firmware for the external device may include retrieving the new firmware via a network. For example, the application may retrieve the new firmware for device 198 from another information handling system via a network.

In one or more embodiments, retrieving the new firmware for the external device may include retrieving the firmware via a memory medium. For example, the application may retrieve the new firmware for device 198 from non-volatile memory medium 160. In one or more embodiments, another application (e.g., another APP of APPs 162-166) may periodically retrieve one or more updates from another information handling system via a network. For example, the other application may have retrieved the new firmware for device 198 and stored the new firmware via non-volatile memory medium 160. For instance, the new firmware for device 198 may be retrieved before device 198 is coupled to IHS 110. In one or more embodiments, the application and the other application may be a same application. For example, the application may be APP 164, and the other application may be APP 164, as well.

At 355, the application may provide the firmware to the external device. For example, the application may provide the firmware to device 198. For instance, the application may utilize OS 162 in providing the firmware to device 198.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
 a processor;
 a memory medium coupled to the processor; and
 an embedded controller coupled to the processor;
 wherein the memory medium includes instructions, executable by the processor, that include an information handling system firmware (IHSFW), a management information exchange, and an application;

wherein the embedded controller:
   determines that an external device is coupled to an input/output (I/O) port of the information handling system; and
   provides a first message to the IHSFW that indicates information associated with the external device; and
wherein as the processor executes the instructions:
   the processor registers the application with the management information exchange;
   the IHSFW provides a second message to the management information exchange;
   the management information exchange starts the application dependent on the registration and in response to the second message; and
   the application:
      determines that firmware of the external device can be updated, wherein when the application determines that firmware of the external device can be updated, the application determines a firmware version of the firmware of the external device and compares the firmware version of the firmware of the external device with an available firmware version;
      receives user input that indicates updating the firmware of the external device;
      retrieves new firmware associated with the external device; and
      provides the new firmware to the external device.

2. The information handling system of claim 1, further comprising:
   an I/O port controller coupled to the embedded controller;
   wherein when the embedded controller determines that the external device is coupled to the I/O port of the information handling system, the embedded controller receives information from I/O port controller indicating at least one of an insertion associated with the external device and an insertion associated with a cable associated with the external device.

3. The information handling system of claim 1, wherein the management information exchange includes at least one of a Windows Management Interface (WMI) and a Common Information Model (CIM).

4. The information handling system of claim 1, wherein when the application retrieves the new firmware associated with the external device, the application retrieves the new firmware includes before the embedded controller detects the external device coupled to the communication port of the information handling system.

5. The information handling system of claim 1, wherein the I/O port includes a type-C port.

6. The information handling system of claim 5, wherein the type-C port includes a female type-C port.

7. The information handling system of claim 1,
   wherein the instructions further include an operating system; and
   wherein when the application provides the new firmware to the external device, the application utilizes the operating system to provide the new firmware to the external device.

8. The information handling system of claim 1, wherein the external device is a dock device.

9. A method of operating an information handling system, comprising:
   an embedded controller of the information handling system determining that an external device is coupled to an input/output (I/O) port of the information handling system;
   the embedded controller providing a first message to an information handling system firmware (IHSFW) that indicates information associated with the external device;
   registering an application with a management information exchange;
   providing, via the IHSFW, a second message to the management information exchange;
   the management information exchange starting the application dependent on the registering and in response to the second message;
   determining that firmware of the external device can be updated, wherein the determining that firmware of the external device can be updated includes determining a firmware version of the firmware of the external device and comparing the firmware version of the firmware of the external device with an available firmware version;
   receiving user input that indicates updating the firmware of the external device;
   retrieving new firmware associated with the external device; and
   providing the new firmware to the external device.

10. The method of claim 9, wherein the embedded controller determining the external device coupled to the I/O port of the information handling system includes the embedded controller receiving information from an I/O port controller of the information handling system indicating at least one of an insertion associated with the external device and an insertion associated with a cable associated with the external device.

11. The method of claim 9, wherein the management information exchange includes at least one of a Windows Management Interface (WMI) and a Common Information Model (CIM).

12. The method of claim 9, wherein the retrieving new firmware associated with the external device includes retrieving the new firmware before the embedded controller detecting the external device coupled to the communication port of the information handling system.

13. The method of claim 9, wherein the I/O port includes a type-C port.

14. The method of claim 13, wherein the type-C port includes a female-C port.

15. The method of claim 9, wherein the providing the new firmware to the external device includes the application utilizing an operating system in the providing the new firmware to the external device.

16. The method of claim 9, wherein the external device is a dock device.

* * * * *